United States Patent Office 3,309,620
Patented Mar. 14, 1967

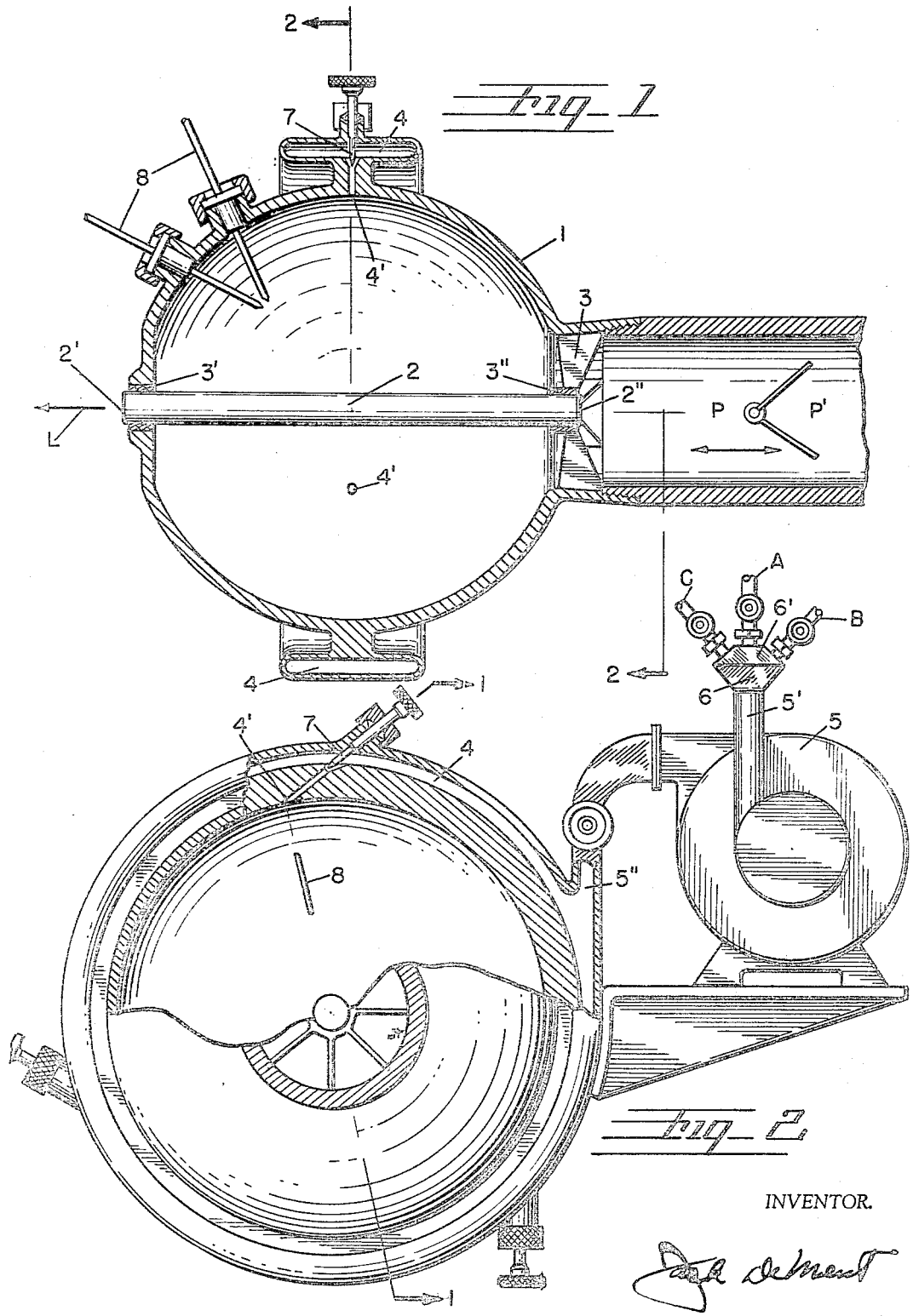

3,309,620
METHOD AND APPARATUS FOR PUMPING A LASER BY EXPLODING DISPERSED METAL PARTICLES
Jack De Ment, 4847 SE. Division St.,
Portland, Oreg. 97206
Filed Mar. 21, 1963, Ser. No. 267,010
14 Claims. (Cl. 331—94.5)

This invention relates to a light producing engine and to laser stimulation; that is, to an engine for the production of intense bursts of electromagnetic energy characterized as lying in the ultraviolet, visible and infrared portions of the spectrum which are adapted to optical coupling with an irradiable target such as one or a plurality of laser resonators. Thus, this invention also relates to method and means for laser stimulation by light emissions characterized as lying in the ultraviolet, visible and infrared portions of the spectrum having power, coherency, monochromaticity, directionality and frequency attributes superior to the usual so-called incoherent or noisy sources of light now available.

It is an object of this invention to provide a light engine apparatus, as well as to method and means for the production of intensely brilliant bursts of ultraviolet, visible and infrared radiations; in particular, to the optical coupling of such light radiations with an irradiable target for the chemical and/or physical treatment thereof, as for example in flash photolysis, luminescence excitation, spectral studies, photosensor triggering, and the like.

It is among the objects of this invention to provide a laser light wave generator, as well as laser pumping methods and means, for such applications as the following:

Research and technology in such variegated areas as specialty and high-speed and micro-photography, including wind tunnel and shock tunnel and schlieren investigations; luminescence excitation by laser light; flash photolysis; atomic absorption analysis; and interferometry and optical design;

Photomachining, photobonding, photowelding, and photoworking of metals, ceramics, and various and sundry inorganics such as glasses and gems and ornamental minerals, also various and sundry organics such as plastics and woods, including the photoglazing of various woods;

Medical and bioscience applications, including photocoagulation, photocauterization, photomicrosurgery, diagnostics such as transillumination, ophthalmic surgery and cerebral cortex surgery, and the like.

Signaling, communication, range finding and optical radars, including problems involving the transmission of intelligence such as computer commands in and into outer space, geodesy and surveying and the alignment of objects such as bridges, missile silos, and structural components generally, and specialty intelligence devices including optical computers;

Military problems including weaponry as exemplified by directed energy weapons, focused energy weapons and radiation weapons for soft and hard targets and for offense and defense, including antipersonnel, antihardware and antimaterial, antiaircraft, antimissile, antisatellite, and the like; and, in particular, optical countermeasures and laser optical electromagnetic warfare.

Other objects and features of this invention are particularly pointed out and described hereinafter.

It is a feature of this invention that an iradiable target such as a laser resonator is stimulated or pumped within a pressure-equalizing spheroidal envelope member by ultraviolet, visible and/or infrared radiations created by the low order detonation, explosion, combustion, deflagration or like reaction of a gas-dispersoid which is typically a light-emitting solid particulate phase reacting with a gas or vapor dispersing phase. For example, the very intense flash of light produced by the reaction of highly subdivided metal dispersoids carried within a dispersing medium such as air, oxygen, nitrogen, carbon dioxide or hydrogen, with or without an adjunctive such as a noble gas such as xenon or a metal-organic compound in vapor or mist state, is optically coupled with an irradiable target such as a laser resonator, as detailed hereinafter, with the result that the laser is pumped.

In the accompanying drawings:

FIG. 1 shows in cross-sectional side-elevation, taken on lines 1—1 of FIG. 2, certain of the features which illustratively embody principal elements of this invention;

FIG. 2 is a rear-elevation view partially in section taken on lines 2—2 of FIG. 1 also illustratively embodying features of this invention;

Before describing the afore-mentioned drawings in detail, a brief description is here presented for purposes of clarity. Typically, the apparauts comprises a light engine including a removable laser resonator rod (or cylinder) positioned within and at the axis of a spheroidal pressure-containing, reactant envelope or bomb having positioned through the wall thereof ignition means such as a spark or arc or resistance heater assembly, and fluidized fuel (or gas-dispersoid) injection means including ingress conduits regulated by valving means, either manually or electrically or electromechanically or the like, the fluidized fuel injection means being operant such that the mixture of solid particulate and dispersing-reactant gas or vapor is introduced into the bomb and, preferably, before explosion is distributed over the inner surface of the bomb with some inward distribution; upon actuation of the ignition means the at least two-phase mixture reacts with the production of an intense flash of light; this light is primarily characteristic of the solid dispersoid, but may be spectrally modified by the dispersing phase and/or additive gas or vapor; the light thus produced strikes resonator or other irradiable target and serves to pump same. Concurrently with the reaction, which is generally accompanied by a sharp pressure rise, the distribution of the pressure being equalized by the spheroidal geometry of the bomb envelope so that all portions of the laser resonator are subject to equal forces and therefore less subject to shattering, the reaction products under pressure are outvalved, whereby to clear the apparatus for a subsequent firing while at the same time the pressure is relieved by the outvalving or exhausting of the reaction products then under pressure. As desired, between firings a cooling and debris removing gas flush may be included. Moreover, by suitable fuel reservoir arrangements and feeding a selection of different fuels can be employed, as for example several different metals in sequence. Although a preferable embodiment of this invention is that in which a laser resonator is pumped, with the emission from the light engine of lasons (laser light pulses), not excluded are such versions as a radially arrayed group of laser resonators converging inwardly into an irradiation chamber, to provide a highly concentrated and compounded field of lasons. Simultaneously striking an irradiable target carried within the central chamber.

The present invention will be better understood from the following more detailed discussion taken in connection with the accompanying drawings.

The drawings in more detail:

In FIG. 1 there is shown a rigid spheroidal housing or hollow enclosure member 1, typically of steel, tempered ceramic, or glass filament wound plastic composition, adapted to withstand the stresses of both pressure and chemical reaction and preferably highly reflective on its interior surface; 2 is an irradiable target such as a laser resonator, in which case 2' is the lason or laser pulse output end, with the laser light being represented by L, and 2" the butt end thereof (usually 100 percent reflective). The laser resonator is mounted axially within member 1, such that the output end 2' rises therethrough; 3 is the rear mount of the laser member 2, having thermal-shock resistant characteristics, with 3' and 3" being shock resilient or resistant mounts. I point out that this axial arrangement is suited to a plurality of laser resonators of the same or different kinds, say of substantially cylindroid geometry bunched in similar axes or, as desired, aligned omnidirectionally. The laser resonator or other target 2 can be sheathed with a protective material that is transparent and preferably refractively matched in the case of a solid laser resonator so that pumping light is utilized to its utmost. With a plurality of laser resonators 2 arranged omnidirectionally, the resonators originate at the center of member 1 and radiate outwardly and rise through or penetrate the wall of 1, as just described, however coming to and residing in a central core or nesting piece by their butt ends.

In FIG. 1 there is further depicted a fuel manifold or fuel injection system 4 which may, as desired, be mounted over and therethrough wall 1 in either a single positioning or, preferably, in equispaced positionings; 4' represents an injection inlet for mixed and ready-to-fire fuel mixture, the nature of which is detailed subsequently. Now proceeding to FIG. 2, there is shown a typical multiple fuel mixing and injecting means 5, as for example an impeller type mixer adapted to receive, move and feed the at least two-phase fuel system which reacts upon ignition to produce the brilliant light field throughout the inside of the bomb member; 5' is the inlet into the mixing chamber which, after treatment via 5, passes through egress conduit 5" into the manifold 4, thence into the feed or injection orifices or jets 4', and thence into the interior of member 1 for ignition.

In FIG. 2 the numeral 6 refers to multi-inlet means integrally connected with means 5'; in 6 there is shown 6', from various inlet sources, as for example A, B and C, in any convenient number and arrangement. 7 is a fuel ratio valve, as for example a needle valve of the micro-control variety; it is pointed out that 7 may be manual, electromechanical, or electronic. 8 depicts the fuel ignition means; this may comprise a pair of spark electrodes, arc electrodes, or electrical conduits having a resistance heater element bridging the two conduits. In certain embodiments of this invention the assembly 8 can be eliminated and therefore can be considered optional, as in the case of hypergolic reactions, e.g., involving atomic hydrogen. Outvalving or exhaust means is shown by 9, which may be pressure-actuated, or of the electromechanically loaded type; it is noted that 9 can serve multiple functions, including pressure reduction by outgassing, as well as exhaust of debris; the arrows represent together with P and P' pressure differential, with P' being less than P.

With respect to member 2, which is here depicted as a laser resonator, it follows that 2 may be a chamber which is adapted to containing an irradiable target, as for example solids, liquids or gases. Such a chamber, hollow in nature and closed on either or both ends and/or provided with inlet and outlet or circulating conduits at one or both ends, will be within the skill of the art.

The light-producing gas-dispersoid, also termed fluidized fuel, comprises a dispersed phase of finely divided solid particles, preferably metal, and a dispersing phase of gas or vapor which acts as reactant upon ignition. Numerous combinations of solid dispersoids and gases or vapors can be used. Typically, the dispersed phase is metal or alloy with a suitable dispersing gas such as oxygen. Additives and adjunctives, to provide an enhancement of spectral qualities, include mercury vapor and the inert gases such as helium, neon, xenon, argon and krypton.

The light produced by metals reacting with pure oxygen as well as with gases normally considered "inert" or nonreactive, e.g., nitrogen and carbon dioxide, is very large on a weight basis. For example, igniting in pure oxygen a cloud of one gram of finely divided tantalum gives in one millisecond a burst of visible light amounting to 185 megalumens, accompanied by substantial amounts of ultraviolet and infrared radiations. Under the same conditions the light outputs of various metal clouds are, for example, approximately 40 megalumens for tungsten; 70 megalumens for molybdenum; and 65 megalumens for cerium. In the case of magnesium and aluminum the values will range between approximately 1000 and 1500 megalumens/gram/millisecond. The light outputs will vary with particle size and concentration, and may substantially exceed these typical figures.

The minimum concentrations or dispersions of metal powders in air igniting from a high-voltage, low-energy spark, e.g., continuous at 20 watts, ranges between approximately 0.05 gram and 5 grams per liter for powders between about 50 microns and 150 microns. This will vary with the mode of preparation of the powder and, of course, with the particular material involved; exceptions include metals like zirconium, which are exceedingly sensitive to luminous deflagration and may be initiated by rough handling at room temperatures. As the particle size gets below several microns the explosibility characteristic also increases, and in the submicron sizes the material is pyrophoric (in which case an initiating spark or arc or heater element is not always necessary). Furthermore, in an atmosphere of pure oxygen the reactivity increases. Hence, the minimum energy required for ignition of extremely fine and/or highly reactive particulates is so small as to be insignificant in practice. Thus, less than 0.01 joule is sufficient to explode most zirconium samples, whereas less than 0.1 joule will generally suffice for such metals as dowmetal and elektron (alloys of aluminum (3–12 percent) and manganese (0.2–0.4 percent), with or without zinc (up to 3.5 percent)), reduced and carbonyl irons (in an oxygen atmosphere inversely proportional to their fineness), stamped and milled magnesium, magnesium-aluminum alloys, stamped and atomized aluminum, milled titanium, milled anganese, zinc, milled silicon, atomized tin, milled antimony, stamped and atomized lead, cadmium, copper, chromium, selenium, uranium, and the like. It is noted that with certain particulates, such as atomized cadmium and stamped lead that the arc or the resistance heater is preferred for ignition.

Dowmetal and elektron, magnesium, magnesium-aluminum alloys, titanium and zirconium are examples of particulates which ignite in pure carbon dioxide, also finely divided aluminum in certain instances, when the metal cloud particles range from between approximately 50 to 150 microns; in the submicron size range the list is extended to include such metals as beryllium, silver, nickel, zinc, boron, thorium and bismuth. In an atmosphere of nitrogen reactant or one of the nitrogen oxides luminous reaction occurs when the temperature is raised sufficiently, as for example in the cases of magnesium (530° C.), tin (900° C.), zirconium (530° C.), magnesium-aluminum alloys (550° C.), and dowmetal and elektron (630° C.), for particles in the range between about 50 and 150 microns.

Carbonaceous and organic particulates luminescently ignite in oxygen-containing atmospheres comparably with magnesium and aluminum powders; thus, carbonaceous and organic particulates of size less than about 50–80 microns, such as coal dust, peat moss, milled wood pulp, and corn starch, require an atmosphere of at least approximately 15 percent oxygen; in pure oxygen the reactivity increases correspondingly.

The spheroidal geometry of the explosion container (FIG. 1) is inherently a pressure-equalizing one. Thus, the pressure within the enclosure will be substantially uniform throughout, albeit there is a pressure rise on an explosion, burning, deflagration or like reaction cycle on a time basis and in amount characteristic of the reactant mixture. For the aid of those skilled in the art, following are typical Hartmann apparatus values for various reactants (where the ignition source is a spark); C is the concentration in grams per liter; p.s.i. is pounds per square inch; particle size approximately 50 to 150 microns; air atmosphere; T is the time from ignition to maximum pressure in milliseconds; P designates pressure):

| Powder | Maximum P, p.s.i. | Rate of P Rise, p.s.i./second | | T | C |
|---|---|---|---|---|---|
| | | Average | Maximum | | |
| Aluminum (atomized) | 32 | 250 | 500 | 128 | 0.1 |
| Aluminum (stamped) | 40 | 1,000 | 2,080 | 40 | 0.1 |
| Magnesium (milled) | 38 | 630 | 1,210 | 60 | 0.1 |
| Titanium (milled) | 26 | 250 | 430 | 104 | 0.1 |
| Aluminum (atomized) | 48 | 570 | 1,100 | 85 | 0.2 |
| Iron (carbonyl) | 22 | 360 | 600 | 60 | 0.2 |
| Magnesium (milled) | 41 | 490 | 860 | 84 | 0.2 |
| Silicon (milled) | 28 | 150 | 360 | 190 | 0.2 |
| Titanium (milled) | 41 | 420 | 830 | 98 | 0.2 |
| Zirconium (milled) | 14 | 100 | 140 | 140 | 0.2 |
| Manganese (milled) | 9 | 50 | 75 | 180 | 0.5 |
| Tin (atomized) | 26 | 240 | 400 | 108 | 0.5 |
| Zinc (condensed) | 11 | 90 | 100 | 122 | 0.5 |
| Magnesium (milled) | 62 | 2,350 | 3,000 | 26 | 1.0 |
| Dowmetal (milled) | 52 | 1,240 | 1,800 | 42 | 1.0 |
| Iron (reduced) | 11 | 25 | 60 | 440 | 1.0 |
| Aluminum (stamped) | 50 | 780 | 1,640 | 64 | 2.0 |
| Silicon (milled) | 60 | 200 | 590 | 300 | 2.0 |

The processes generally employed for the production of fine metal powders include atomization, chemical precipitation, reduction by carbon monoxide or hydrogen, condensation, decomposition of such compounds as carbonyls, electrolytic deposition, graining, machining, milling, shotting and stamping, with combinations and variations often being employed. Vapor condensation methods, e.g., set out in U. S. Patent 3,065,958, yield powders as fine as 0.03–0.06 micron, with large surface areas, e.g., $75 \times 10^4$ cm.$^2$/gm. The particle sizes given by other processes vary from several microns to several hundred microns.

Pyrophoric materials are useful in this invention as one of the phases of the at least two-phase gas-dispersoid system which emits pumping light. For example pyrophoric alloys include the various rare earth metals such as misch metal, didymium metal, cerium metal, and lanthanum-enriched misch metals; also, the highly pyrophoric manganese-antimony alloy, $Mn_2Sb$ (corresponding to 43.8 percent by weight of antimony). Also, metal oxides and related compositions, e.g., lower oxides made by (a) converting a metal compound to the pyrophoric condition as a lower oxide, which is then converted to a semipyrophoric state by slow exposure to air or dilute oxygen or by treatment at an elevated temperature with an oxygen-free gas, or (b) introducing a pyrophoric lower oxide into an organic liquid, e.g., methanol, diethyl ether, aldehydes, ketones, esters, and either evaporating the liquid or working up the suspension into a semipyrophoric composition, e.g., ferrous oxalate is heated to 410° C. for 10 minutes in a tube in which air has been replaced by nitrogen; on cooling, pyrophoric FeO is obtained.

Yet another composition characterized by exceptional luminosity typically comprises a mixture of three parts of tetranitromethane, one part of toluene and up to several parts of a gas such as argon; as may be desired, a few tenths of a percent of particulate brisant explosive such as trinitrotoluene may be added. The luminosity of such mixtures is exceedingly great; one cubic centimeter of the first two-named liquids in a vapor state, together with the said corresponding amount of gas such as argon, produces a burst of light in excess of 10 megacandles, the flash of light lasting less than 5 microseconds. As desired, a few tenths of a percent of metal particulate such as copper, aluminum or iron enhances the light output by augmenting the more or less continuous spectrum with lines characteristic of the particulate. The gas such as argon is but one example of a number that can be employed; generally, the luminosity of the accompanying detonation increases with the density of the gas, e.g., being in the order of hydrogen, nitrogen, oxygen and chlorine; and helium, neon, argon and krypton; least luminosities are obtained with hydrogen and helium and these are generally not preferred. The output is also rich in the ultraviolet.

In the embodiment involving hypergolic reactions more than one pump (5 in FIG. 2) is employed, as for example two pumps for a two-phase hypergolic reaction mixture, each of the reactants being introduced into member 1 by separate pumps, to produce light upon admixture and reaction. Examples of hypergolic reactants include metal-organic compounds with an appropriate gas, as for example trimethyl and triethylaluminum, and diethylzinc (with oxygen or chlorine).

Finally, I note for purposes of this disclosure that when I employ the term "reactant gas" or "gas" I include "vapor," "mist" and like dispersing and/or adjunctive media comprising the gas-dispersoid characterized as an explodable light-producing system.

I claim:

1. An apparatus for irradiating a target with bursts of light characterized as lying in the ultraviolet, visible and infrared portions of the electromagnetic wave spectrum which comprises a spheroidal, pressure-resistant chamber having an elongated irradiable target positioned along the diameter of said chamber, a pressurized source of explodable light-releasing particulate solid and a pressurized source of reactant gas, each of said sources being provided with a conduit in communication with valve dispensing means which form a premix of the said solid and reactant gas, conduit means leading from the said valve dispensing means to a premix impeller, said impeller being to feed the said premix into the said chamber, a conduit leading from the impeller to the chamber, ignition means mounted within the chamber, said ignition means being provided with a source of electric energy, and a debris exhaust, whereby upon introduction of the premix into the chamber and ignition thereof by the electric ignition means a light-releasing explosion occurs with subsequent removal of the debris from the explosion via the said exhaust.

2. An apparatus as set forth in claim 1 wherein the irradiable target is a laser resonator, said resonator having its output end passing through the wall of the said chamber.

3. An apparatus as set forth in claim 1 wherein the said explodable light-releasing particulate solid is a finely divided metal and the said reactant gas carries in admixture a minor proportion of a noble gas.

4. An apparatus as set forth in claim 1 wherein the said explodable light-releasing particulate solid is a finely divided metal which carries in admixture a minor proportion of a brisant explosive, and the said reactant gas carries in admixture a minor proportion of a noble gas and an organic vapor characterized as reactive with the said finely divided metal.

5. An apparatus as set forth in claim 3 wherein the irradiable target is a laser resonator, said resonator having its output end passing through the wall of the said chamber.

6. An apparatus as set forth in claim 4 wherein the irradiable target is a laser resonator, said resonator having it output end passing through the wall of the said chamber.

7. A laser light generator which comprises a laser resonator supported within a spheroidal, pressure-equalizing and pressure-resistant envelope, said laser resonator having its output end passing through the said envelope, ingress means communicating through the wall of the envelope for feeding a mixture of dispersed explodable light-producing substances into the envelope, ignition means within the envelope for exploding the said mixture, and egress means communicating through the wall of the envelope to remove debris from the explosion of said mixture.

8. A laser light generator as set forth in claim 7 wherein the said explodable light-releasing mixture comprises a finely divided metal and a reactant gas.

9. A laser light generator as set forth in claim 7 wherein the said explodable light-releasing mixture comprises a finely divided metal in admixture with a minor proportion of a brisant explosive together with a metal reactant gas in admixture with a minor proportion of a noble gas.

10. A laser light generator which comprises an elongated laser resonator supported within a spheroidal, pressure-equalizing and pressure-resistant envelope and at the axis thereof, said laser resonator having its output end projecting through the wall of the envelope, ingress means communicating through the wall of the envelope adapted to feed into the envelope a mixture of gas-dispersed explodable light-producing substances, said mixture being characterized as a finely divided metal and a reactant gas, ignition means within the envelope for exploding the said mixture, and egress means communicating through the wall of the envelope to remove debris from the explosion of the said mixture.

11. The method of pumping a laser resonator which comprises the steps of admixing a light-releasing particulate solid with a reactant gas such that a gas-dispersoid is formed, moving a mass of the said gas-dispersoid into an optical coupling position with a laser resonator, exploding the said gas-dispersoid, whereby to create laser pumping light, optically coupling the said pumping light with the said laser resonator, removing the exploded gas-dispersoid from the said optical-coupling position, and repeating the aforementioned cycle until the pumping threshold of the laser resonator is attained.

12. The method of pumping a laser resonator which comprises the steps of admixing a finely divided metal with a reactant gas so as to form an explodable light-releasing gas-dispersoid, placing the said gas-dispersoid in an optical-coupling position with a laser resonator, exploding the said gas-dispersoid, whereby to create laser pumping light, optically coupling the said pumping light with the laser resonator, removing the exploded gas-dispersoid from the said optical-coupling position, and repeating the aforementioned cycle until the pumping threshold of the laser resonator is attained.

13. The method of pumping a laser resonator as set forth in claim 12 which includes the step of admixing a minor proportion of noble gas with the said gas-dispersoid.

14. The method of pumping a laser resonator as set forth in claim 12 which includes the steps of admixing a minor proportion of noble gas and a minor proportion of a brisant explosive with the said gas-dispersoid.

References Cited by the Examiner
UNITED STATES PATENTS

| | | | |
|---|---|---|---|
| 3,163,799 | 12/1964 | Buchman | 331—94.5 X |
| 3,210,688 | 10/1965 | Simpson | 331—94.5 |
| 3,235,816 | 2/1966 | Wanlass | 331—94.5 |

JEWELL H. PEDERSEN, *Primary Examiner.*

E. S. BAUER, *Assistant Examiner.*